United States Patent
Mamadou

(10) Patent No.: US 9,583,960 B2
(45) Date of Patent: Feb. 28, 2017

(54) METHOD FOR OPTIMALLY CHARGING AN ELECTROCHEMICAL BATTERY

(75) Inventor: Kelli Mamadou, Fort de France (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 421 days.

(21) Appl. No.: 14/111,636

(22) PCT Filed: Apr. 13, 2012

(86) PCT No.: PCT/EP2012/056735
§ 371 (c)(1),
(2), (4) Date: Oct. 14, 2013

(87) PCT Pub. No.: WO2012/140176
PCT Pub. Date: Oct. 18, 2012

(65) Prior Publication Data
US 2014/0035538 A1   Feb. 6, 2014

(30) Foreign Application Priority Data
Apr. 15, 2011   (FR) ...................................... 11 53293

(51) Int. Cl.
| | | |
|---|---|---|
| *H02J 7/04* | (2006.01) | |
| *G01R 19/14* | (2006.01) | |
| *G01R 1/06* | (2006.01) | |
| *G01P 3/42* | (2006.01) | |
| *H02J 7/00* | (2006.01) | |
| *H01M 10/44* | (2006.01) | |
| *H01M 10/46* | (2006.01) | |

(52) U.S. Cl.
CPC .............. *H02J 7/007* (2013.01); *H01M 10/44* (2013.01); *H01M 10/441* (2013.01); *H01M 10/46* (2013.01)

(58) Field of Classification Search
CPC ........... Y02E 60/12; H02J 7/14; H02J 7/0068; H01M 10/44; H01M 10/441; G01R 19/155; G01R 19/14; G01R 19/15; G01R 19/16557; G01R 31/026; G01R 1/06777; G01R 1/06788; G01R 11/04; G01R 19/145; G01P 3/44; G01P 3/489; G01P 3/481; G01P 3/487; G01P 21/02
USPC .......................... 320/162; 324/133, 149, 160
See application file for complete search history.

(56) References Cited

U.S. PATENT DOCUMENTS

| | | | | |
|---|---|---|---|---|
| 5,039,929 A | * | 8/1991 | Veistroffer | H02J 7/008 320/107 |
| 7,528,574 B1 | * | 5/2009 | Adkins | H01M 10/44 320/128 |
| 2009/0295338 A1 | | 12/2009 | Hawawini et al. | |

(Continued)

FOREIGN PATENT DOCUMENTS

FR   2 803 105 A   12/2000

*Primary Examiner* — Richard Isla Rodas
*Assistant Examiner* — Mohammed J Sharief
(74) *Attorney, Agent, or Firm* — Frommer Lawrence & Haug LLP

(57) ABSTRACT

Method for charging an electrochemical accumulator, comprising a step (E10) of determining the initial state of the electrochemical accumulator, characterized in that it comprises a step (E11) of determining the regime of charge of the electrochemical accumulator by optimizing the product of a charging time saving and an energy saving as a function of the initial state of the electrochemical accumulator.

10 Claims, 3 Drawing Sheets

(56) References Cited

U.S. PATENT DOCUMENTS

2010/0006338 A1   1/2010   Desai

* cited by examiner

METHOD FOR OPTIMALLY CHARGING AN ELECTROCHEMICAL BATTERY

This application is a 371 of PCT/EP2012/056735 filed on Apr. 13, 2012, published on Oct. 18, 2012 under publication number WO 2012/140176, which claims priority benefits from French Patent Application Number 1153293 filed Apr. 15, 2011, the disclosure of which is incorporated herein by reference.

The invention relates to a method for charging an electrochemical accumulator. It relates also to any device or system incorporating an electrochemical accumulator whose management is based on such a charging method.

To control the operation of any appliance or system incorporating at least one electrochemical accumulator, it is essential to know and control the performance levels of this accumulator, notably to manage its charging and discharging phases and, ultimately, optimize the operation of the appliance or of the system.

For this, the manufacturer of an accumulator generally recommends a slow charging regime in so-called nominal conditions, which makes it possible to charge the accumulator to the maximum and without damaging it. This charging regime is more specifically defined by the electrical conditions, that is to say the current and voltage values, which are applied to the terminals of an accumulator for a certain time to charge it. These electrical conditions are defined by an algorithm which depends on the electrochemical technology concerned.

As an example, FIG. 1 represents the electrical conditions recommended for charging an accumulator based on a lithium ion technology of $LiFePO_4$ type. The curves 1, 2 respectively represent the trend of the charging current and voltage as a function of time. The charging algorithm thus illustrated, called IU algorithm, comprises a phase I during which the charging current is constant while the voltage increases, and a phase U, which begins from a certain voltage threshold value $U_{thresh}$, and during which the voltage is kept constant at this threshold value $U_{thresh}$. During this last phase U, the current tends towards a zero value. Below a certain value $I_{thresh}$, set by the manufacturer, the charging of the accumulator is considered to be complete. The total charging time is therefore the sum of the duration $t_I$ of the phase I and of the duration $t_U$ of the phase U. In practice, it is above all the value of the charging current of the phase I which determines the overall charging time.

This charging regime, as defined by an electrochemical accumulator manufacturer, is often considered too slow for many applications. To overcome this drawback, it is then known practice to implement faster charges, at a higher regime. These faster solutions then present the drawback of a reduced charging efficiency, even of inducing premature ageing of the accumulator.

Thus, there is a need to define an optimum solution for charging an electrochemical accumulator, which makes it possible to achieve a good trade-off between the charging time and the charging efficiency.

To this end, the invention relies on a method for charging an electrochemical accumulator, comprising a step of determining the initial state of the electrochemical accumulator, characterized in that it comprises a step of determining the charging regime of the electrochemical accumulator by optimizing the product of a charging time saving and an energy saving as a function of the initial state of the electrochemical accumulator.

The step of determining the initial state of the electrochemical accumulator may comprise the calculation of its initial state of charge ($SOC_0$) or of its initial state of energy ($SOE_0$).

The step of determining the charging regime of the electrochemical accumulator may comprise maximizing the product $G_t(I_{ch}) \times G_{wh}(I_{ch})$ where $G_t(I_{ch})$ is the charging time saving, which is calculated as the ratio between the charging time saved for a considered charging regime ($I_{ch}$) relative to a reference slow charging time, to the charging time of this slow regime, and where
$G_{wh}(I_{ch})$ is the energy saving, which is defined as the ratio between the reduction of energy injected into the accumulator at the considered charging regime ($I_{ch}$) relative to the energy injected at a reference slow regime, to the energy injected into the accumulator at the slow regime.

The method for charging an electrochemical accumulator may also comprise a step of charging the electrochemical accumulator comprising a charging period with constant current (Ich) whose value is determined to maximize the product of a charging time saving and an energy saving.

The charging step may comprise a charging period with constant current up to a voltage threshold value then a charging period with constant voltage at this threshold value.

The charging method may comprise a phase of calibrating the electrochemical accumulator, making it possible to store its charging time as a function of different charging regimes for different initial state values and the step of determining the charging regime of the electrochemical accumulator may comprise a calculation based on the data stored in the calibration phase.

The electrochemical accumulator calibration phase may comprise carrying out n×m charging phases for n different charging regimes and m initial states of charge of the electrochemical accumulator, and n may be between 5 and 10 inclusive and/or m may be between 4 and 8 inclusive.

The first electrochemical accumulator calibration phase may comprise the iteration of the following steps E1 to E4 for each of the n charging regimes ($I_{chi}$), for i varying from 1 to n, and of the m initial states of charge ($SOC_{0j}$), for j varying from 1 to m:
E1: charging the accumulator to full charge in nominal conditions;
E2: discharging the accumulator in nominal conditions, to a state of charge of the electrochemical accumulator at the $SOC_{0j}$ value sought;
E3: fully charging the accumulator at a charging regime ($I_{chi}$);
E4: completely discharging the accumulator in nominal conditions.

The step of fully charging E3 the accumulator at a charging regime ($I_{chi}$) may comprise the following substeps:
E33: measuring and storing the total charging time ($t_{chij}$) obtained;
E34: measuring and storing the total quantity ($A_{chij}$) of ampere-hours injected for this charge and/or of the energy ($W_{hij}$) injected into the accumulator.

The electrochemical accumulator calibration phase may also comprise an iteration of a number of charging phases for different temperatures.

The invention also relates to a device for charging an electrochemical accumulator, characterized in that it implements a charging method as described previously.

The invention also relates to a system comprising a device powered by an electrochemical accumulator, characterized in that it comprises a device for charging this accumulator as described above.

These objects, features and advantages of the present invention will be explained in detail in the following description of a particular embodiment given as a nonlimiting example in relation to the attached figures in which.

Figure 5:
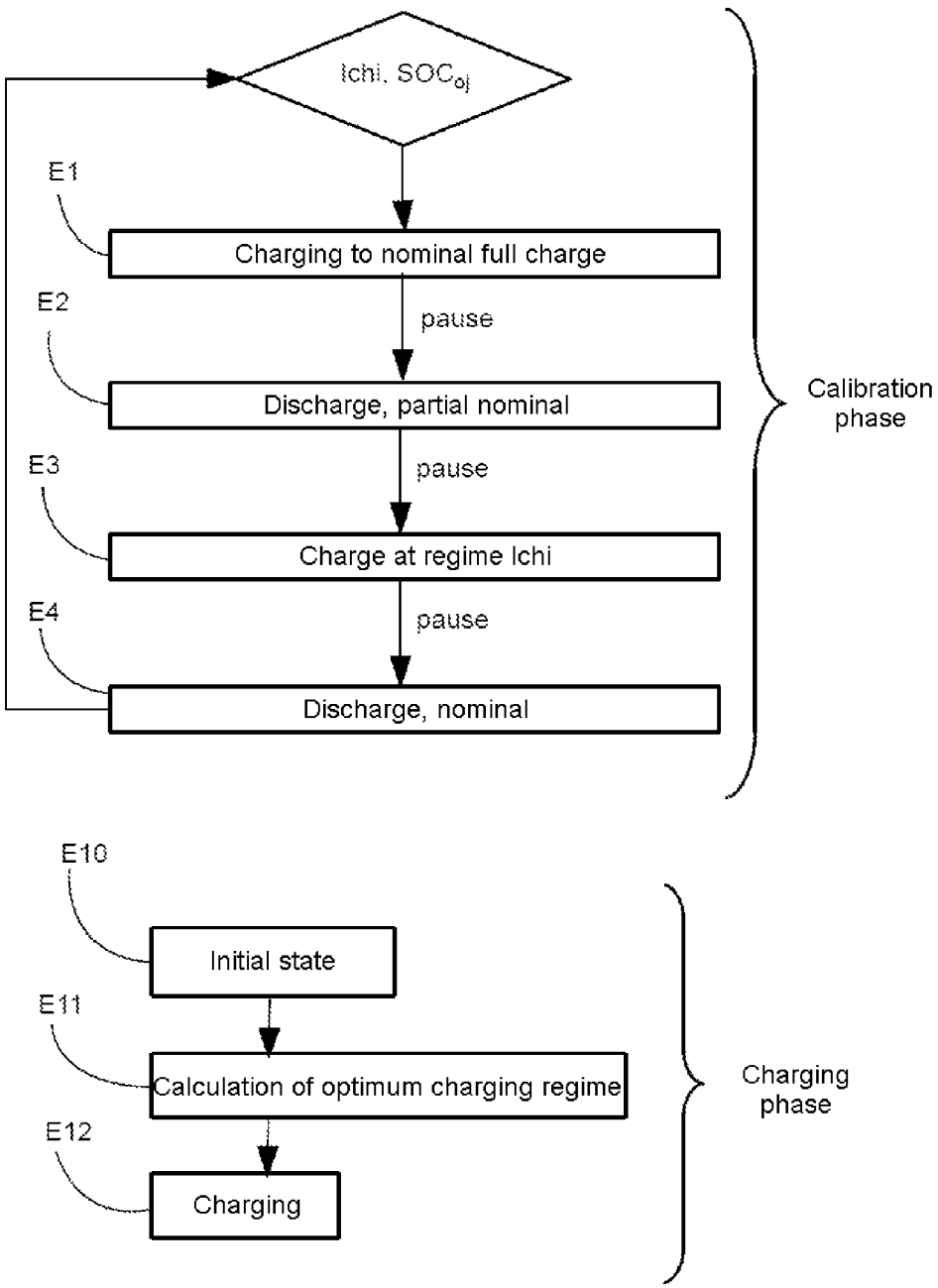
FIG. 5 represents an algorithm of the charging method according to the embodiment of the invention.

According to the embodiment, the invention relies on a method for charging an electrochemical accumulator, the algorithm of which is illustrated in FIG. 5, which comprises a first phase of calibrating this electrochemical accumulator or an accumulator representative of the electrochemical technology used.

This first calibration phase consists in determining the charging time needed to fully charge an accumulator and the effectiveness of said charge, from a number of initial states of the accumulator and from a number of charging regimes. This calibration thus makes it possible to define a table of values or chart, which will serve as a reference in optimizing the charging of an accumulator, which will be explained hereinbelow.

According to the embodiment, the calibration is obtained for a number of accumulator charging regimes, that is to say for a number of electrical conditions I, U. For this, it is, for example, possible to define a number of charging current values $I_{ch}$ in the case of the use of an IU algorithm as shown with reference to FIG. 1. It should be noted that this same principle remains valid for any charging algorithm for an electrochemical accumulator, regardless of the electrical algorithm used. For simplicity, the IU algorithm will be considered hereinbelow.

These different charging regime values include the nominal regime, that is to say the value recommended by the manufacturer, and the charging performance is truly tested for each of these charging regimes. A number n of different charging current values between 5 and 10 represents a good trade-off. These n values can be chosen, uniformly distributed or not, over a range of use of the accumulator, and/or for high or low regimes.

Then, the calibration is also performed for different initial states of charge $SOC_0$ of the accumulator. It should be noted that the state of charge of the accumulator, commonly referred to as simply SOC, represents the available capacity of the accumulator over a scale from 0 to 1, the values of 0 and 1 respectively representing the fully discharged and fully charged states of the accumulator. This calibration is performed over m state of charge values, m advantageously being between 4 and 8.

It should be noted that the state of energy, referred to as SOE, defined as the ratio between the energy $E_{d/PN}$ available assuming an energy discharge in nominal conditions of the accumulator and the nominal energy $E_N$, therefore defined by the formula $SOE = E_{d/PN}/E_N$, can be substituted for the SOC parameter mentioned above. This SOE value is, likewise, between 0 and 1, the value equal to 1 corresponding to a fully charged state of energy of the accumulator and the value equal to 0 corresponding to a fully discharged state.

The calibration phase therefore relies on carrying out n×m charging phases on an electrochemical accumulator by varying the regime and the initial state of charge of the accumulator, as described above. These n×m charging conditions are chosen in such as way as not to cause any abnormal degradation or ageing of the accumulator. They remain within the ranges of values that are considered to be acceptable by the accumulator. For these different charging cycles, the ambient temperature remains constant, preferably between 20 and 25° C. For an aqueous electrochemical accumulator, water is regularly added to maintain its performance throughout the calibration phase.

Figure 1:
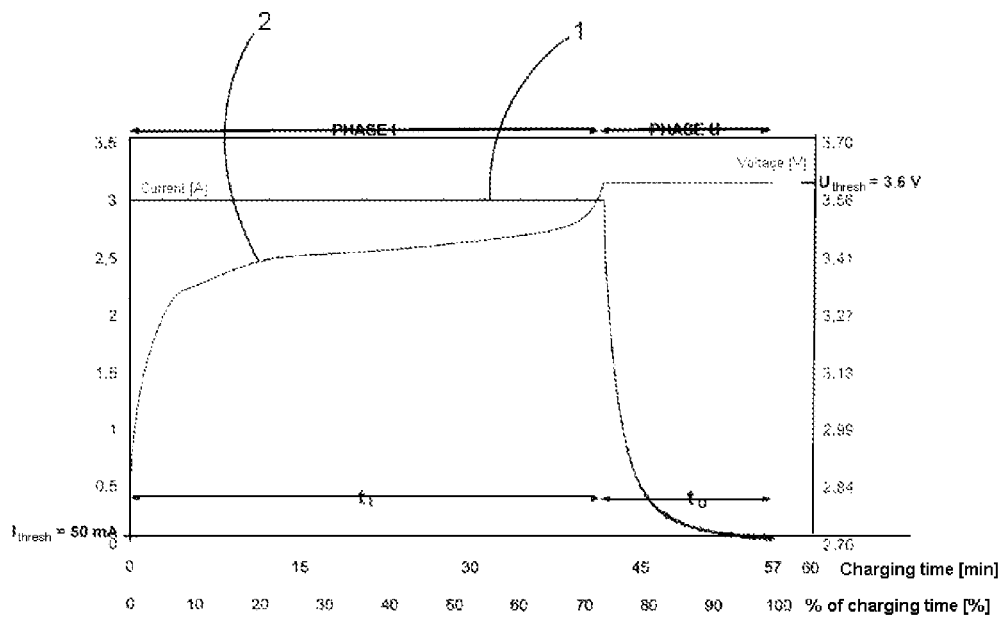
FIG. 1 represents the trend of the charging current and voltage as a function of time according to an IU charging algorithm for an electrochemical accumulator of the prior art.

According to the embodiment of the invention, this calibration phase finally comprises the following steps, repeated in succession for each of the n values of $I_{ch}$, (for i varying from 1 to n) and of the m $SOC_{0j}$ values (for j varying from 1 to m):

E1: charging the accumulator to full charge in nominal conditions, for a charging regime comprising a phase with constant current Ichn, at the nominal value, then a phase with constant voltage Uthresh, as represented in FIG. 1;

E2: discharging in nominal conditions, for a discharging current $I_{dch}$ equal to the nominal value $I_{dchn}$. It should be noted that the latter is defined within a discharging band recommended by the manufacturer, and to be as reproducible as possible to obtain the most reliable calibration possible. For example, the discharging regime that makes it possible to achieve the full discharge in one hour is acceptable for the lithium-ion technology. This discharge is continued until the quantity of ampere/hours restored (Ah) is equal to $(1-SOC_{c0j}) \times C_n$, where $C_n$ represents the nominal capacity of the accumulator, the total number of Ah restored in a total discharge in nominal conditions. Such a discharge makes it possible to position the electrochemical accumulator in a state of charge at the $SOC_{0j}$ value sought;

E3: fully charging the accumulator at a regime i, defined by a charging current $I_{ch} = I_{chi}$. This step comprises the following substeps:

E31: charging in phase I with constant current $I_{chi}$ up to the voltage threshold value $U_{thresh}$;

E32: charging in phase U at constant voltage with the value $U_{thresh}$ until the current drops below its threshold value $I_{thresh}$;

It should be noted that these two substeps E31 and E32 will be adapted to any other charging algorithm depending on the accumulator technology being calibrated. Then, in parallel with the two substeps E31 and E32, the following substeps are carried out:

E33: measuring and storing the total charging time $t_{chij}$ obtained from the conditions of regime $I_{chi}$ and of initial state of charge $SOC_{0j}$;

E34: measuring and storing the total quantity $A_{chij}$ of ampere-hours injected for this charge and/or the energy $W_{hij}$ injected into the accumulator, from the conditions of regime $I_{chi}$ and of initial state of charge $SOC_{0j}$.

E4: new total discharge in the nominal conditions of the battery.

A pause is inserted between these different steps E1-E4, for a sufficient relaxation time, for example between 10 and 60 minutes.

According to a variant embodiment, the calibration is also performed by varying the temperature. For this, p temperature values are chosen, within a range of, for example, 0 to 40° C. The preceding steps E1 to E4 are then reiterated for the n×m×p values considered, in a table with three entries instead of two.

When this calibration is done, it is possible to deduce laws between all the values used, notably between the charging time, the initial state of charge and the charging regime of the electrochemical accumulator. It is quite simply possible to extrapolate the values not directly measured by the iteration steps explained previously from actual measurements performed. The calibration phase may thus comprise a final step E5 of determining all the values from the n×m (or n×m×p) actual measurements obtained. The results of this calibration phase are stored for analysis.

Figure 2:
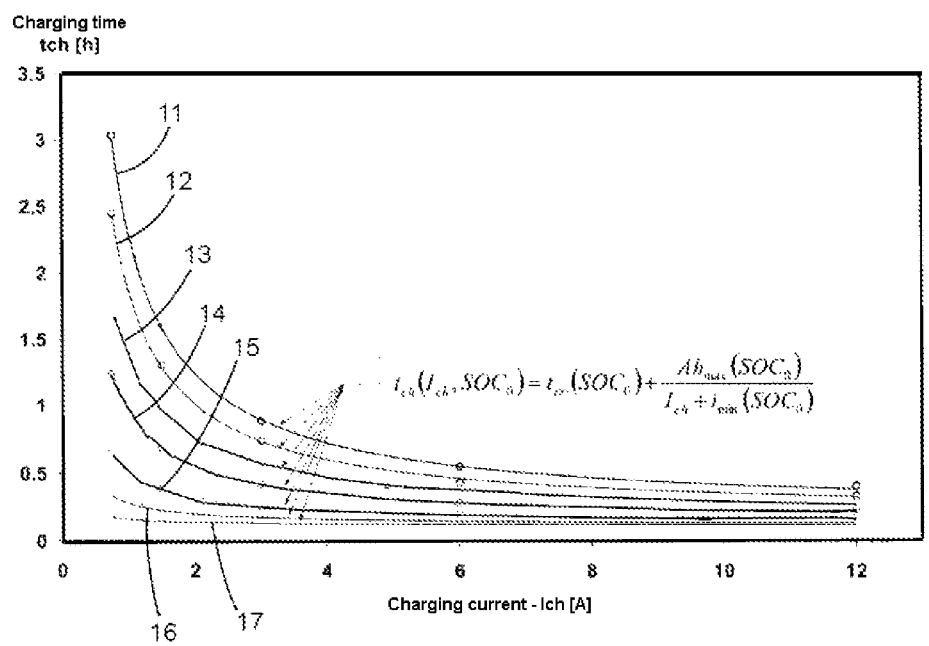
FIG. 2 illustrates a few curves representing the charging time of an accumulator as a function of the charging regime, for different initial states of charge, according to the embodiment of the invention.

FIG. 2 illustrates, by way of example, some curves representing the charging time of an accumulator as as function of the charging regime, for different initial states of charge. More specifically, the curves 11, 12, 13, 14, 15, 16, 17 correspond respectively to an initial state of charge of 0%, 20%, 40%, 60%, 80%, 90% and 95%.

As a variant, the calibration described above can be replaced by a theoretical calculation, based, for example, on a physical modelling of the accumulator, or by any other method making it possible to provide as output the values of the table mentioned previously.

Then, the method for charging an electrochemical accumulator comprises a second charging phase, comprising determining the conditions of charge of a certain accumulator, which relies on finding an optimum trade-off between reducing the charging time and its efficiency or increasing the charging energy injected.

According to the embodiment, the following two quantities are considered for measuring the two criteria mentioned above:

$G_t(I_{ch})$: this is a time saving, which is calculated as the ratio between the charging time $t_{ch}$ saved for a charging regime $I_{ch}$ relative to a slow charging time (slow regime $I_l$), to the charging time of this slow regime.

This saving is therefore defined by the following formula:

$$G_t(I_{ch}) = (t_{ch}(I_{ch}) - t_{ch}(I_l))/t_{ch}(I_l)$$

$G_{wh}(I_{ch})$: this is the energy saving, which is defined as the ratio between the reduction of energy injected into the accumulator at the fast charging regime $I_{ch}$ relative to that injected at a reference slow regime $I_l$, to the energy injected into the accumulator at the slow regime.

This saving is therefore defined by the following formula:

$$G_{wh}(I_{ch}) = (W_h(I_{ch}) - W_h(I_l))/W_h(I_l)$$

It should be noted that the above savings have been used by way of example, but there are other possibilities for defining quantities that make it possible to represent the time saving and the energy saving in an equivalent manner. These saving terms will therefore be understood to cover all quantities in the wide sense which respectively represent a sensitivity to the charging time of an electrochemical accumulator and a sensitivity to the energy efficiency of the charging of an electrochemical accumulator.

Figure 3:
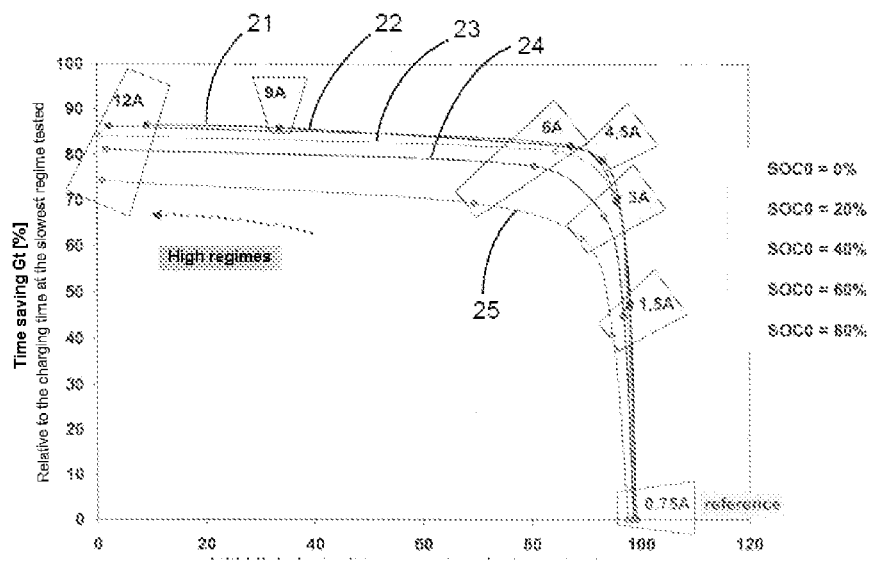
FIG. 3 represents the time saving as a function of the energy saving, for different initial state of charge $SOC_0$ values according to the embodiment of the invention.

FIG. 3 represents the time saving as a function of the energy saving, for different initial state of charge $SOC_0$ values. More specifically, the curves 21, 22, 23, 24, 25 respectively represent these curves for initial state of charge values of 0%, 20%, 40%, 60% and 80%. They clearly show that, for a zero time saving, the energy efficiency is maximum, and that, when the time saving increases, the energy efficiency decreases, to tend towards zero for a time saving between 75 and 90%. It should be noted that the plotting of these curves is made possible by virtue of the calibration data obtained in the first phase, as explained previously.

According to the embodiment, the optimum trade-off of the conditions of charge of the electrochemical accumulator is defined by considering the product $G_t(I_{ch}) \times G_{wh}(I_{ch})$ between the two savings defined above and by maximizing this product. Thus, the method comprises a step of searching for the charging regime (here the charging current $I_{ch}$) which makes it possible to maximize this product.

Figure 4:
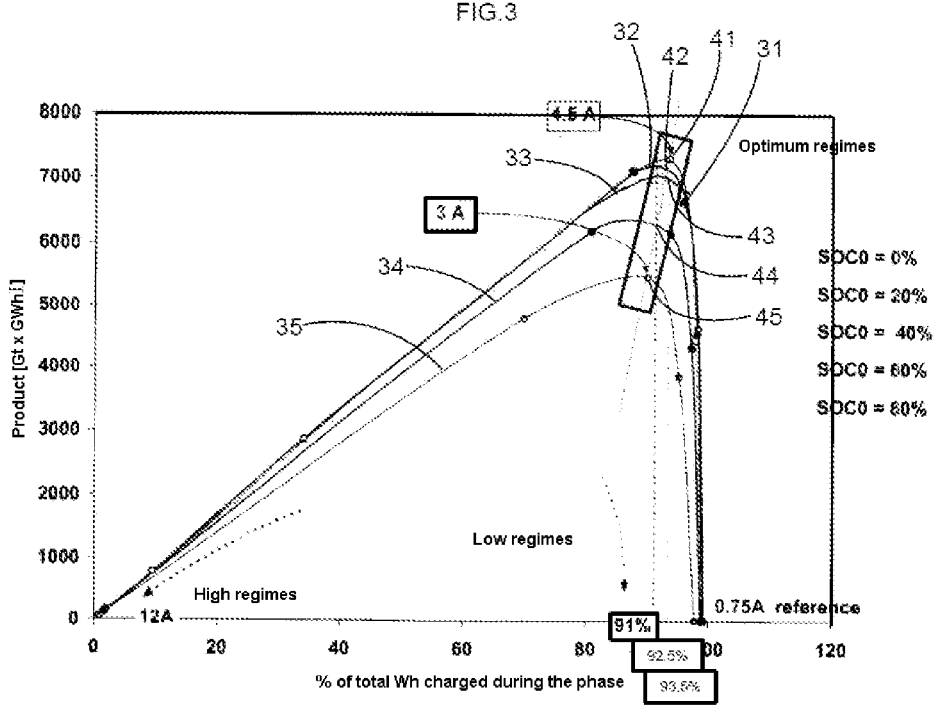
FIG. 4 represents the product of the time saving as a function of the energy saving, for different initial state of charge $SOC_0$ values according to the embodiment of the invention.

FIG. 4 represents this product as a function of the energy saving, for different initial state of charge $SOC_0$ values. More specifically, the curves 31, 32, 33, 34, 35 respectively represent these curves for initial state of charge values of 0%, 20%, 40%, 60% and 80%. The points 41, 42, 43, 44, 45 represent the optimum situations.

Thus, the method for charging an electrochemical accumulator comprises a step E10 of determining the state of charge $SOC_0$ of the accumulator, or an equivalent value like a state of energy $SOE_0$. It thus generally comprises a step E10 of determining the initial state of the electrochemical accumulator. The implementation of this step makes it possible, for example, to determine which curve out of the curves 31 to 35 of FIG. 4 is relevant in light of the state of the accumulator that is to be charged.

Then, it comprises a step E11 of searching for the optimum charging regime, which maximizes the product of the savings explained above. Its possible implementation consists in choosing the maximum point 41 to 45 of the curve identified 31 to 35 above. This point makes it possible to get up to the value of the current $I_{ch}$ of the corresponding charging regime, by virtue of the calibration data. Then, the charging as such is performed in a step E12, based on the usual IU algorithm, by using the determined current value $I_{ch}$ for the phase I of this charge, the second phase U remaining standard, up to the end of the charge according to any predefined criteria.

Naturally, the identification of the maximum product between the two savings considered can be done as a variant by any other mathematical calculation means than the use of the curves of FIG. 4.

Furthermore, this principle is applicable for any predefined charging algorithm, like the constant current algorithms generally used for NiMH-type accumulators, or the algorithms of IUi type. It is also applicable to any other algorithm. The concept of the invention is thus suited to any electrochemical accumulator, whatever its electrochemical technology used, such as lithium, nickel or lead.

The invention also relates to a device for charging such an electrochemical accumulator, which implements the charging method described above.

It also relates to a system comprising a device powered by an electrochemical accumulator and a device for charging this accumulator, which implements the charging method described above. For this, the system can use software and/or hardware means, comprising, for example, a memory incorporating the calibration data defined by the calibration phase described previously, and a computer for accurately knowing the state of the accumulator, in real time or not, and for implementing the above calculations.

The invention claimed is:

1. Method for charging an electrochemical accumulator comprising the following:
   (a) determining the initial state;
   (b) searching for an optimum charging regime determined by:
      (i) carrying out a phase of calibrating the electrochemical accumulator, making it possible to know its charging time as a function of different charging regimes for different electrochemical accumulator initial state values;

(ii) defining two quantities called time saving and energy saving and respectively representing a sensitivity to the charging time of an accumulator and a sensitivity to the energy efficiency; and (iii) calculating for an initial state of the electrochemical accumulator, a charging regime for the electrochemical accumulator which maximizes the product of the time saving and of the energy saving defined in (ii);

for an initial state of the accumulator corresponding to that determined in (a) and (c) charging the electrochemical accumulator with the charging regime defined in (b).

2. The method of claim 1, wherein the electrochemical accumulator calibration phase comprises carrying out n×m charging phases for n different charging regimes and m initial states of charge of the electrochemical accumulator.

3. The method of claim 2, wherein n is between 5 and 10 inclusive and/or m is between 4 and 8 inclusive.

4. The method of claim 2, wherein the first electrochemical accumulator calibration phase comprises the iteration of the following steps E1 to E4 for each of the n charging regimes ($I_{chi}$), for i varying from 1 to n, and of the m initial states of charge ($SOC_{0j}$), for j varying from 1 to m:

E1: charging the accumulator to full charge in nominal conditions;

E2: discharging the accumulator in nominal conditions, to a state of charge of the electrochemical accumulator at the $SOC_{0j}$ value sought;

E3: fully charging the accumulator at a charging regime ($I_{chi}$);

E4: completely discharging the accumulator in nominal conditions.

5. The method of claim 4, wherein the step of fully charging the accumulator at a charging regime ($I_{chi}$) comprises the following substeps:

E33: measuring and storing the total charging time ($t_{chij}$) obtained;

E34: measuring and storing the total quantity ($A_{chij}$) of ampere-hours injected for this charge and/or of the energy ($W_{hij}$) injected into the accumulator.

6. The method of claim 1, wherein the electrochemical accumulator calibration phase also comprises an iteration of a number of charging phases for different temperatures.

7. Method for charging an electrochemical accumulator according to claim 1, wherein the step of determining the initial state of the electrochemical accumulator comprises the calculation of its initial state of charge ($SOC_0$) or of its initial state of energy ($SOE_0$).

8. Method for charging an electrochemical accumulator according to claim 1, wherein the step of determining the charging regime of the electrochemical accumulator comprises maximizing the product $G_t(I_{ch}) \times G_{wh}(I_{ch})$ where $G_t(I_{ch})$ is the charging time saving, which is calculated as the ratio between the charging time saved for a considered charging regime ($I_{ch}$) relative to a reference slow charging time, to the charging time of this slow regime, and where $G_{wh}(I_{ch})$ is the energy saving, which is defined as the ratio between the reduction of energy injected into the accumulator at the considered charging regime ($I_{ch}$) relative to the energy injected at a reference slow regime, to the energy injected into the accumulator at the slow regime.

9. Method for charging an electrochemical accumulator according to claim 1, wherein it comprises a step of charging the electrochemical accumulator comprising a charging period with constant current (Ich) whose value is determined to maximize the product of a charging time saving and an energy saving.

10. Method for charging an electrochemical accumulator according to claim 9, wherein the charging step comprises a charging period with constant current up to a voltage threshold value, then a charging period with constant voltage at this threshold value.

* * * * *